United States Patent
Yoshiki

(10) Patent No.: US 9,898,035 B2
(45) Date of Patent: Feb. 20, 2018

(54) CLOCK SYNCHRONIZATION METHOD

(71) Applicant: MegaChips Corporation, Osaka (JP)

(72) Inventor: Tamotsu Yoshiki, Chiba (JP)

(73) Assignee: MEGACHIPS CORPORATION, Osaka (JP)

( * ) Notice: Subject to any disclaimer, the term of this patent is extended or adjusted under 35 U.S.C. 154(b) by 24 days.

(21) Appl. No.: 15/044,163

(22) Filed: Feb. 16, 2016

(65) Prior Publication Data

US 2016/0239042 A1    Aug. 18, 2016

(30) Foreign Application Priority Data

Feb. 16, 2015   (JP) ................ 2015-027776

(51) Int. Cl.
| | |
|---|---|
| G06F 1/00 | (2006.01) |
| G06F 1/10 | (2006.01) |
| G06F 1/04 | (2006.01) |
| G06F 1/08 | (2006.01) |

(52) U.S. Cl.
CPC ................. *G06F 1/10* (2013.01); *G06F 1/04* (2013.01); *G06F 1/08* (2013.01)

(58) Field of Classification Search
CPC ..................................... G06F 1/04; G06F 1/08
See application file for complete search history.

(56) References Cited

U.S. PATENT DOCUMENTS

| | | |
|---|---|---|
| 2001/0040475 A1 | 11/2001 | Inohara |
| 2002/0027461 A1 | 3/2002 | Kusunoki |
| 2002/0060595 A1 | 5/2002 | Nakano |

FOREIGN PATENT DOCUMENTS

| | | |
|---|---|---|
| JP | H09-51255 A | 2/1997 |
| JP | 2001-320022 A | 11/2001 |
| JP | 2002-076127 A | 3/2002 |
| JP | 2002-158286 A | 5/2002 |

*Primary Examiner* — Austin Hicks
(74) *Attorney, Agent, or Firm* — Osha Liang LLP

(57) ABSTRACT

The first synchronous FF is disposed at the starting point of the clock tree of the frequency-divided clock of each lower hierarchical block, and the first maximum delay time of the reference clock from the branch point of the reference clock and the frequency-divided clock to the first synchronous FF is acquired. The second maximum delay time of the reference clock between adjacent two of second synchronous FFs is determined so as to be less than half the period of the reference clock. The number of stages of the second synchronous FFs is determined according to the first and second maximum delay times. The target delay time from the branch point is determined so as to be not more than the second maximum delay time, and the second synchronous FF and a latch are disposed so as to achieve the target delay time.

10 Claims, 17 Drawing Sheets

CLOCK SYNCHRONIZATION METHOD

CROSS-REFERENCE TO RELATED APPLICATIONS

The present application claims priority under 35 U.S.C. § 119 to Japanese Patent Application No. 2015-027776, filed on Feb. 16, 2015. The above application is hereby expressly incorporated by reference, in its entirety, into the present application.

BACKGROUND OF THE INVENTION

This invention relates to a clock synchronization method for synchronizing the phases of a reference clock and a frequency-divided clock which are supplied from a clock generation circuit provided in a top hierarchical block to terminal flip-flops (FFs) provided in each of a plurality of lower hierarchical blocks.

In a layout design of a large-scale semiconductor integrated circuit, a hierarchical layout design technique is used. In the hierarchical layout design technique, a large part of a circuit in a semiconductor integrated circuit is divided into a plurality of lower hierarchical blocks, and the layout design of each of the lower hierarchical blocks is carried out. Subsequently or concurrently, a layout design of a top hierarchical block excluding the lower hierarchical blocks is carried out, and a clock signal is connected to each of the lower hierarchical blocks while wirings interconnecting between the lower hierarchical blocks are connected.

In the layout design of the lower hierarchical blocks and the top hierarchical block, in order to supply a clock signal to a group of a very large number of FFs in each of the lower hierarchical blocks, a technique called clock tree synthesis is used. The clock tree synthesis is a function for making uniform the delay times (synchronizing the phases) of the clock signal which reaches, through associated paths, all of the FFs in each of the lower hierarchical blocks from a starting point in the top hierarchical block.

In the hierarchical layout design technique, since clock wiring extends across the top hierarchical block and each of the lower hierarchical blocks, a clock tree of a downstream portion is generated in each of the lower hierarchical blocks. Then, on the basis of the result, a clock tree of an upstream portion is generated in the top hierarchical block, and the delay time of a clock signal in the top hierarchical block is adjusted such that the delay times of the clock signal from the clock signal starting point to all of the FFs in each of the lower hierarchical blocks are made uniform.

In a semiconductor integrated circuit, fluctuation in the delay times of signals occurs due to process variation in manufacturing, voltage/temperature variation during operation, or the like. When the layout design is made, timing closure is carried out such that the circuit operates normally even if delay time variation among signals occurs. Specifically, the variation in delay time of each signal is called "On Chip Variation (OCV)," and the timing closure is carried out such that the semiconductor integrated circuit operates normally even if a margin for OCV is taken into account.

Further, in a large-scale integrated circuit, in many cases, a frequency-divided clock group is generated from a reference clock by a clock generation circuit in a top hierarchical block, and is distributed to each of lower hierarchical blocks. Thus, the reference clock and the frequency-divided clock are branched off on an upstream side of a clock tree, and the paths of the reference clock and the frequency-divided clock after the branch point tend to be longer. Since the long clock paths for each of the lower hierarchical blocks after the branch point vary individually, a timing margin to be considered is to be a large value, which leads to difficulty in timing closure.

FIG. 6 is a conceptual diagram of an example showing the configuration of a conventional semiconductor integrated circuit. A semiconductor integrated circuit 70 shown in the drawing is designed by a hierarchical layout design technique, and is provided with three lower hierarchical blocks A, B, and C, and a top hierarchical block excluding the lower hierarchical blocks A, B, and C. The top hierarchical block includes a clock generation circuit 12, and the clock generation circuit 12 includes a PLL circuit 14 and a frequency divider circuit 16.

In the case of the semiconductor integrated circuit 70, in the clock generation circuit 12, a reference clock 15 is generated by the PLL circuit 14, and the reference clock 15 output from the PLL circuit 14 is frequency-divided by the frequency divider circuit 16 to generate a frequency-divided clock 17. Each of the lower hierarchical blocks A, B, and C is provided with first terminal FFs 18 operating in synchronization with the reference clock 15 and second terminal FFs 20 operating in synchronization with the frequency-divided clock 17. The reference clock 15 and the frequency-divided clock 17 are supplied from the clock generation circuit 12 to all of the first terminal FFs 18 and all of the second terminal FFs 20 in each of the lower hierarchical blocks A, B, and C, respectively.

When layout design of the semiconductor integrated circuit 70 is carried out, in the hierarchical layout design technique, first, clock trees (in FIG. 6, indicated by triangular frames) 19 and 21 of the reference clock and the frequency-divided clock are generated for each of the lower hierarchical blocks A, B, and C. Since the lower hierarchical blocks A, B, and C are different in size or the number of the first terminal FFs 18 and the number of the second terminal FFs 20, the delay times of the clock trees are different. In the example shown in the drawing, the delay times of the clock trees 19 and 21 of the reference clock and the frequency-divided clock in the lower hierarchical blocks A, B, and C are 2 ns, 7 ns, and 5 ns, respectively.

Subsequently, clock trees of the reference clock 15 and the frequency-divided clock 17 are generated in the top hierarchical block. In this case, the delay times of the clock trees of the reference clock 15 and the frequency-divided clock 17 in the top hierarchical block are adjusted so as to eliminate skews, that is, the delay times of the clock trees 19 and 21 of the reference clock and the frequency-divided clock in the lower hierarchical blocks A, B, and C. In the example shown in the drawing, the delay times of the clock trees of the reference clock 15 and the frequency-divided clock 17 from the clock generation circuit 12 to the lower hierarchical blocks A, B, and C are 10 ns, 5 ns, and 7 ns, respectively.

From this, the delay times from a branch point 13 of the reference clock 15 and the frequency-divided clock 17 to the first terminal FFs 18 and the second terminal FFs 20 of each of the lower hierarchical blocks A, B, and C are adjusted to 12 ns, and consequently, all of the first terminal FFs 18 and second terminal FFs 20 of the lower hierarchical blocks A, B, and C can be synchronously operated.

However, in this case, there is a problem in that the timing margins of the reference clock 15 and the frequency-divided clock 17 are excessively large, and therefore, the design is difficult. Since the frequency-divided clock 17 branched off from the reference clock 15 in the clock generation circuit 12 is supplied to each of the lower hierarchical blocks A, B, and C, the clock path corresponding to 12 ns downstream of the branch point 13 of the reference clock 15 and the frequency-divided clock 17 is a portion to have OCV variation.

As shown in FIG. 7, when a period of the reference clock 15 is 5 ns, that is, when a period of the frequency-divided clock 17 obtained by dividing the frequency of the reference clock 15 by two is 10 ns, for example, there is needed a large timing margin exceeding one period of the reference clock 15, that is, in this example, the timing margin of 12 ns in total including 6 ns before the rising timing of the reference clock 15 and the frequency-divided clock 17 and 6 ns after the same, and thus, the layout design becomes extremely difficult.

In order to solve this problem, as shown in FIG. 8, a synchronous FF 41 which receives the frequency-divided clock 17 as a data signal in synchronization with the reference clock 15 and newly outputs the frequency-divided clock 17 in synchronization with the reference clock 15 is disposed on the path of the frequency-divided clock 17 at a position near each of the lower hierarchical blocks A, B, and C.

With this, the branch point is moved from the branch point 13 of the reference clock 15 and the frequency-divided clock 17 to a branch point 37 near each of the lower hierarchical blocks A, B, and C, and as shown in FIG. 9, the timing margin can be made small to a certain degree. In this example, the timing margin can be reduced to 8 ns in total.

Further, as shown in FIG. 10, the synchronous FF 41 is moved to a position near the second terminal FFs 20 inside each of the lower hierarchical blocks A, B, and C, whereby the branch point can be moved from the branch point 13 of the reference clock 15 and the frequency-divided clock 17 to a branch point 39 near the second terminal FFs 20 inside each of the lower hierarchical blocks A, B, and C, and as shown in FIG. 11, the timing margin can be made still smaller. In this example, the timing margin can be reduced to 4 ns in total.

However, in this case, there is a problem in that the timing closure of the synchronous FF 41 disposed on the clock path is difficult.

As shown in FIG. 12, in many cases, the delay time of the reference clock 15 supplied to the synchronous FF 41 is greater than one period of the reference clock 15. In this example, the delay times of the reference clock 15 from the branch point 13 of the reference clock 15 and the frequency-divided clock 17 inside the clock generation circuit 12 to the synchronous FFs 41 inside the lower hierarchical blocks A, B, and C are 11 ns, 7 ns, and 9 ns, respectively.

When the delay exceeding a period of the reference clock 15 occurs in the reference clock 15 flowing through the clock path of the synchronous FF 41, in many cases, the same degree of delay also occurs in the frequency-divided clock 17 flowing through the data path running parallel to the clock path of the synchronous FF 41. If the delay time of the data path exceeds the period, a set-up restriction of synchronous design may not be satisfied. For this reason, as shown in FIG. 13, it is necessary to add plural stages of synchronous FFs 41 to the data path such that the delay time of the data path falls within one period of the reference clock 15.

However, even if the plurality of synchronous FFs 41 are added such that the delay time of the data path falls within one period, it is difficult to satisfy a hold restriction.

Hereinafter, difficulty in satisfying the hold restriction will be described.

First, as shown in FIG. 14, timing closure of a group of synchronous FFs 41 with respect to one lower hierarchical block is considered.

If only the group of synchronous FFs 41 is in question, as shown in FIG. 15, buffers 45 are inserted in the paths of the reference clock from the branch point of the reference clock and the frequency-divided clock to all of the synchronous FFs 41 to make the delay times uniform (to eliminate a clock skew), whereby the set-up/hold restriction can be satisfied.

Meanwhile, as in the above-described example, when there are three lower hierarchical blocks A, B, and C, and the delay times associated with the lower hierarchical blocks A, B, and C are 11 ns, 7 ns, and 9 ns, respectively, and thus different, in general, the clock delays are adjusted to 11 ns which is the maximum value among the three values so as to prevent punch-through of data.

However, in this case, there is a problem in that by adjusting the delay times of the FFs constituting the frequency divider circuit and all groups of synchronous FFs 41 to the maximum delay time, the number of buffers 45 added on the path of the reference clock becomes very large, and accordingly, the layout area and power consumption increase. Furthermore, if the difference between the maximum value and the minimum value of the delay time of the reference clock exceeds one period of the reference clock, this exceeds a time width which can be dealt with by synchronous design, and thus, timing closure is not possible.

In this case, the above-described method of adjusting the delay times of the reference clock to the maximum delay time does not work well. Therefore, as shown in FIG. 16, the set-up/hold restriction needs to be satisfied while partially or wholly shifting the delay times of the reference clock.

Next, difficulty in satisfying the set-up/hold restriction while shifting the delay times of the reference clock will be described.

Since a semiconductor integrated circuit needs to be operated under various temperature, voltage, and process conditions within an operation guaranteed range, it is necessary to consider delay fluctuation caused by various operation environments. In order to prevent punch-through of data, as shown in FIGS. 17A and 17B, data Q output from a preceding-stage FFA needs to be delayed by buffers 47 so that data D of a subsequent-stage FFB changes after the rise of a clock CLK of the subsequent-stage FFB. For this reason, in this configuration, the delay time of the buffers 47 in the data path should be larger than the delay time of buffers 49 in the clock path.

Although the delay time of each of the cells fluctuates due to the operation environment, since the delay times of the buffers 47 and 49 are large, the magnitude of delay fluctuation of the data path is large. Since the clock path also has delay variation, it is difficult to carry out timing closure to satisfy the set-up/hold restriction while considering the delay variations of both paths. In actual layout design of a semiconductor integrated circuit, usually, it is necessary to readjust timing closure many times.

Here, prior art literatures relevant to the invention include JP 2002-76127 A relating to a distribution system of a clock signal for synchronization on a semiconductor integrated circuit and a semiconductor chip, JP 2002-158286 A relating to a semiconductor integrated circuit or the like which controls clock distribution, JP 2001-320022 A relating to a clock distribution system in an integrated circuit in which a multi-phase clock is distributed to internal circuits, and JP 9-51255 A relating to a clock generation circuit which generates a plurality of delayed clocks by dividing the frequency of a reference clock to delay the reference clock.

SUMMARY OF THE INVENTION

An object of the invention is to solve the above-described problems in the prior art and provide a clock synchronization method capable of significantly reducing a timing margin required for synchronizing a reference clock and a frequency-divided clock to thereby facilitate timing closure.

In order to attain the above-described object, the invention provides a clock synchronization method for synchronizing phases of a reference clock and a frequency-divided clock obtained by dividing frequency of the reference clock, the reference clock and the frequency-divided clock being supplied from a clock generation circuit in a top hierarchical block to first terminal FFs operating in synchronization with the reference clock and second terminal FFs operating in synchronization with the frequency-divided clock through a clock tree of the reference clock and a clock tree of the frequency-divided clock in each of lower hierarchical blocks, the clock synchronization method comprising:

a step of disposing a first synchronous FF connected to a starting point of the clock tree of the reference clock in each of the lower hierarchical blocks, the first synchronous FF holding the frequency-divided clock as a data signal at a starting point of the clock tree of the frequency-divided clock of each of the lower hierarchical blocks in synchronization with the reference clock input from the clock tree of the reference clock in each of the lower hierarchical blocks and inputting the held data signal of the frequency-divided clock as a data input;

a step of determining a delay time of the reference clock from a branch point of the reference clock and the frequency-divided clock to the first synchronous FF of each of the lower hierarchical blocks and acquiring a maximum value of the delay time of the reference clock;

a step of determining a maximum value of a delay time of the reference clock between adjacent two of second synchronous FFs disposed in series on a wiring path of the frequency-divided clock associated with each of the lower hierarchical blocks so as to be a time less than half the period of the reference clock;

a step of determining the number of stages of the second synchronous FFs, which are disposed in series on the wiring path of the frequency-divided clock associated with each of the lower hierarchical blocks and sequentially hold the frequency-divided clock as a data signal in synchronization with the reference clock, such that the wiring path of the frequency-divided clock associated with each of the lower hierarchical blocks is divided by a value which is equal to or greater than a division result obtained by dividing the maximum value of the delay time of the reference clock by the maximum value of the delay time of the reference clock between adjacent two of the second synchronous FFs and is a multiple of a frequency division number of the frequency-divided clock;

a step of determining a target value of a delay time from the branch point of the reference clock and the frequency-divided clock to each of the second synchronous FFs and the first synchronous FF of each of the lower hierarchical blocks so as to be a delay time equal to or less than the maximum value of the delay time of the reference clock between adjacent two of the second synchronous FFs;

a step of disposing each of the second synchronous FFs of the determined number of stages at a position on the wiring path of the frequency-divided clock where the delay time from the branch point of the reference clock and the frequency-divided clock to each of the second synchronous FFs of the determined number of stages and the first synchronous FF of each of the lower hierarchical blocks is the target value of the delay time;

a step of disposing a latch downstream of each of the second synchronous FFs on the wiring path of the frequency-divided clock, the latch allowing an output signal of a preceding-stage second synchronous FF to pass during a period during which the reference clock connected to a clock input terminal of the preceding-stage second synchronous FF is at low level; and a step of connecting a delayed reference clock obtained by delaying the reference clock connected to a clock input terminal of a first-stage second synchronous FF of each of the lower hierarchical blocks by a relevant target value of the delay time for each of the second synchronous FFs, to a clock input terminal of each of the second synchronous FFs and connecting the delayed reference clock connected to a final-stage second synchronous FF to the starting point of the clock tree of the reference clock.

In the invention, the first synchronous FF is disposed at the start pointing of the clock tree of the frequency-divided clock of the lower hierarchical block, whereby the branch point of the reference clock and the frequency-divided clock is moved to the branch point of the reference clock and the frequency-divided clock in the first synchronous FF. Therefore, it is possible to shorten the wiring distance from the branch point to the second terminal FF, and thus, it is possible to reduce a timing margin and to facilitate timing closure.

Further, according to the invention, the latch is added behind the second synchronous FF, whereby the latch holds and outputs the data signal of the frequency-divided clock having passed through the second synchronous FF, for example, at the rising edge of the reference clock while the reference clock is at high level. With this, since the start timing of change of the frequency-divided clock is reliably delayed by a time corresponding to half the period of the reference clock, it is not necessary to secure the delay time with a buffer, and timing closure is facilitated.

DETAILED DESCRIPTION OF THE INVENTION

Hereinafter, a clock synchronization method of the invention will be described in detail based on a preferred embodiment shown in the accompanying drawings.

Figure 1:
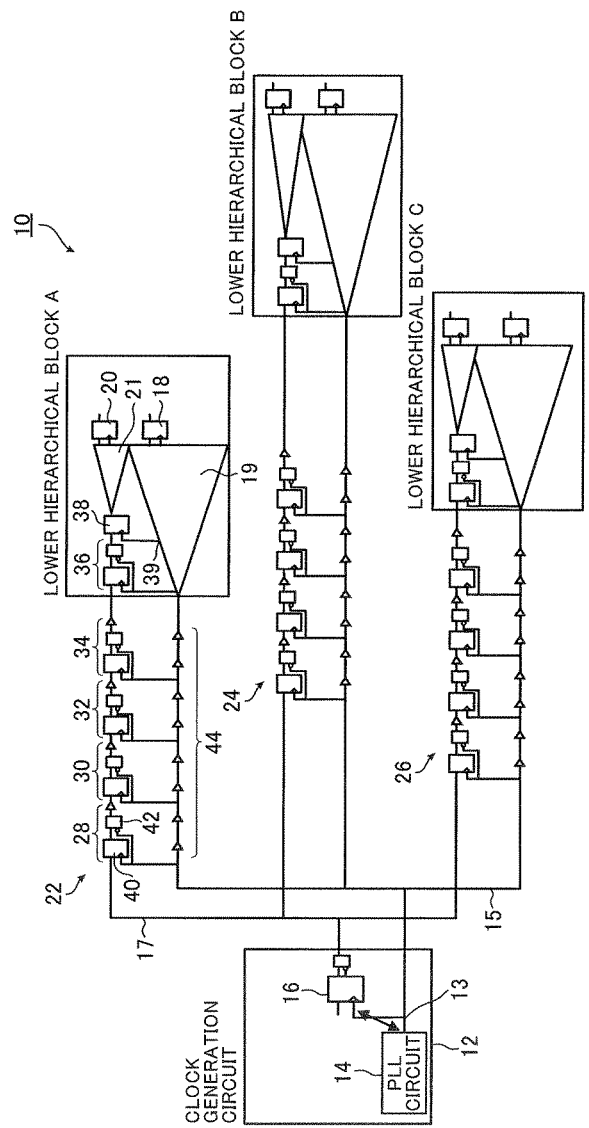
FIG. 1 is a circuit diagram of an embodiment showing the configuration of a semiconductor integrated circuit designed using a clock synchronization method of the invention.

FIG. 1 is a circuit diagram of an embodiment showing the configuration of a semiconductor integrated circuit designed using a clock synchronization method of the invention. A semiconductor integrated circuit 10 shown in the drawing is designed using the clock synchronization method of the invention and a hierarchical layout design technique, and is provided with three lower hierarchical blocks A, B, and C, and a top hierarchical block excluding the lower hierarchical blocks A, B, and C.

The top hierarchical block is provided with a clock generation circuit 12, and the clock generation circuit 12 includes a PLL circuit 14 which generates a reference clock 15 having a certain period (frequency), and a frequency divider circuit 16 which divides the frequency of the reference clock 15 generated by the PLL circuit 14 by n (where n is an integer equal to or greater than two) to generate a frequency-divided clock 17.

The frequency divider circuit 16 of the example shown in the drawing is provided with a latch at a position downstream of a divider which divides the frequency of the reference clock 15. As with a latch 42 described below, the latch allows data to pass during a low level period of the reference clock 15 input to the divider. This latch is not essential but may be provided.

Each of the lower hierarchical blocks A, B, and C is provided with first terminal FFs 18 which operate in synchronization with the reference clock 15, second terminal FFs 20 which operate in synchronization with the frequency-divided clock 17, and clock trees (in FIG. 1, indicated by triangular frames) 19 and 21 of the reference clock and the frequency-divided clock which are used inside each of the lower hierarchical blocks A, B, and C.

Next, a clock synchronization circuit is for synchronizing the phases of the reference clock and the frequency-divided clock which are supplied from the clock generation circuit 12 to the first terminal FFs 18 and the second terminal FFs 20 through the clock trees 19 and 21 of the reference clock and the frequency-divided clock in each of the lower hierarchical blocks A, B, and C, and includes first, second, and third clock synchronization circuits 22, 24, and 26 corresponding to the lower hierarchical blocks A, B, and C.

The first clock synchronization circuit 22 is provided with basic synchronization circuits 28, 30, 32, 34, and 36 of five stages, a first synchronous FF 38, and buffers 44 which delay the reference clock 15. The basic synchronization circuits 28, 30, 32, and 34 of the first to fourth stages and the buffers 44 are located in the top hierarchical block, and the basic synchronization circuit 36 of the fifth stage and the first synchronous FF 38 are located inside the lower hierarchical block A.

The first-stage basic synchronization circuit 28 includes a second synchronous FF 40 and a latch 42. The reference clock 15 is input from the PLL circuit 14 in the clock generation circuit 12 to the clock input terminal of the second synchronous FF 40, and the frequency-divided clock 17 is input from the frequency divider circuit 16 to the data input terminal of the second synchronous FF 40. The reference clock 15 is inverted at the input to the clock input terminal of the latch 42, and the output signal of the second synchronous FF 40 is input to the data input terminal of the latch 42.

The second synchronous FF 40 holds (re-holds) the frequency-divided clock 17 in synchronization with the rise of the reference clock 15.

The latch 42 allows the output signal of the preceding-stage second synchronous FF 40 to pass during a period during which the reference clock is at low level, and holds the output signal of the second synchronous FF 40 having passed therethrough during a period during which the reference clock is at high level.

In the example of FIG. 1, a buffer is provided behind the latch 42. This buffer is not essential but may be provided behind the latch 42.

The basic synchronization circuits 30, 32, 34, and 36 of the second to fifth stages have the same configuration as the first-stage basic synchronization circuit 28. In each of the basic synchronization circuits 30, 32, 34, and 36, the output signal of the latch 42 of each of the preceding stage basic synchronization circuits 28, 30, 32, and 34 is input to the data input terminal of the second synchronous FF 40, and a delayed reference clock obtained by sequentially delaying the reference clock 15 by the buffers 44 by a certain delay time as well as the inversion thereof are input to the clock input terminal of the second synchronous FF 40 and the clock input terminal of the latch 42.

The reference clock which is used inside the lower hierarchical block A is input from the clock tree 19 of the reference clock 15 to the clock input terminal of the first synchronous FF 38, and the output signal of the latch 42 of the fifth-stage basic synchronization circuit 36 is input to the data input terminal of the first synchronous FF 38.

The first synchronous FF 38 holds the output signal of the latch of the fifth-stage basic synchronization circuit 36 in synchronization with the rise of the reference clock which is used inside the lower hierarchical block A.

The delayed reference clock input to the clock input terminal of the second synchronous FF 40 of the fifth-stage basic synchronization circuit 36 is input to the starting point (input terminal) of the clock tree 19 of the reference clock as the reference clock used inside the lower hierarchical block A, and the output signal of the first synchronous FF 38 is input to the starting point of the clock tree 21 of the frequency-divided clock as the frequency-divided clock used inside the lower hierarchical block A.

The second and third clock synchronization circuits 24 and 26 have the same configuration as the first clock synchronization circuit 22.

In the case of the semiconductor integrated circuit 10, in the top hierarchical block, the reference clock 15 having a certain period is generated by the PLL circuit 14 in the clock generation circuit 12, and the frequency of the reference clock 15 is divided by n by the frequency divider circuit 16 to generate the frequency-divided clock 17.

Subsequently, the reference clock 15 is sequentially delayed by the buffers 44 corresponding to each of the lower hierarchical blocks A, B, and C to generate a delayed reference clock, and the delayed reference clock is supplied to all of the first terminal FFs 18 through the clock tree 19 of the reference clock.

The frequency-divided clock 17 is held as a data signal by the second synchronous FF 40 of the first-stage basic synchronization circuit 28 of the clock synchronization circuit corresponding to each of the lower hierarchical blocks A, B, and C in synchronization with the rise of the reference clock 15, and subsequently, the output signal of the second synchronous FF 40 is held by the latch 42 during a period during which the reference clock 15 input to the second synchronous FF 40 is at high level, whereby the output signal of the second synchronous FF 40 is delayed by a time corresponding to half the period of the reference clock 15.

Similarly, the output signal of the latch 42 of the first-stage basic synchronization circuit 28 is held by the second synchronous FF 40 of the second-stage basic synchronization circuit 30 during half the period from the rise to the fall of the delayed reference clock delayed by the buffers 44, and subsequently, the output signal of the second synchronous FF 40 is delayed by the latch 42 by a time corresponding to half the period of the delayed reference clock during a period during which the delayed reference clock is at high level. The basic synchronization circuits 32, 34, and 36 of the third to fifth stages operate in the same manner.

Then, the output signal of the latch 42 of the fifth-stage basic synchronization circuit 36 is held as a data signal by the first synchronous FF 38 in synchronization with the rise of the reference clock input from the clock tree 19 of the reference clock, and the output signal of the first synchronous FF 38, that is, the frequency-divided clock having been subjected to timing adjustment is supplied to all of the second terminal FFs 20 through the clock tree 21 of the frequency-divided clock which inputs the data signal of the frequency-divided clock held by the first synchronous FF 38 as data input.

Figure 2:
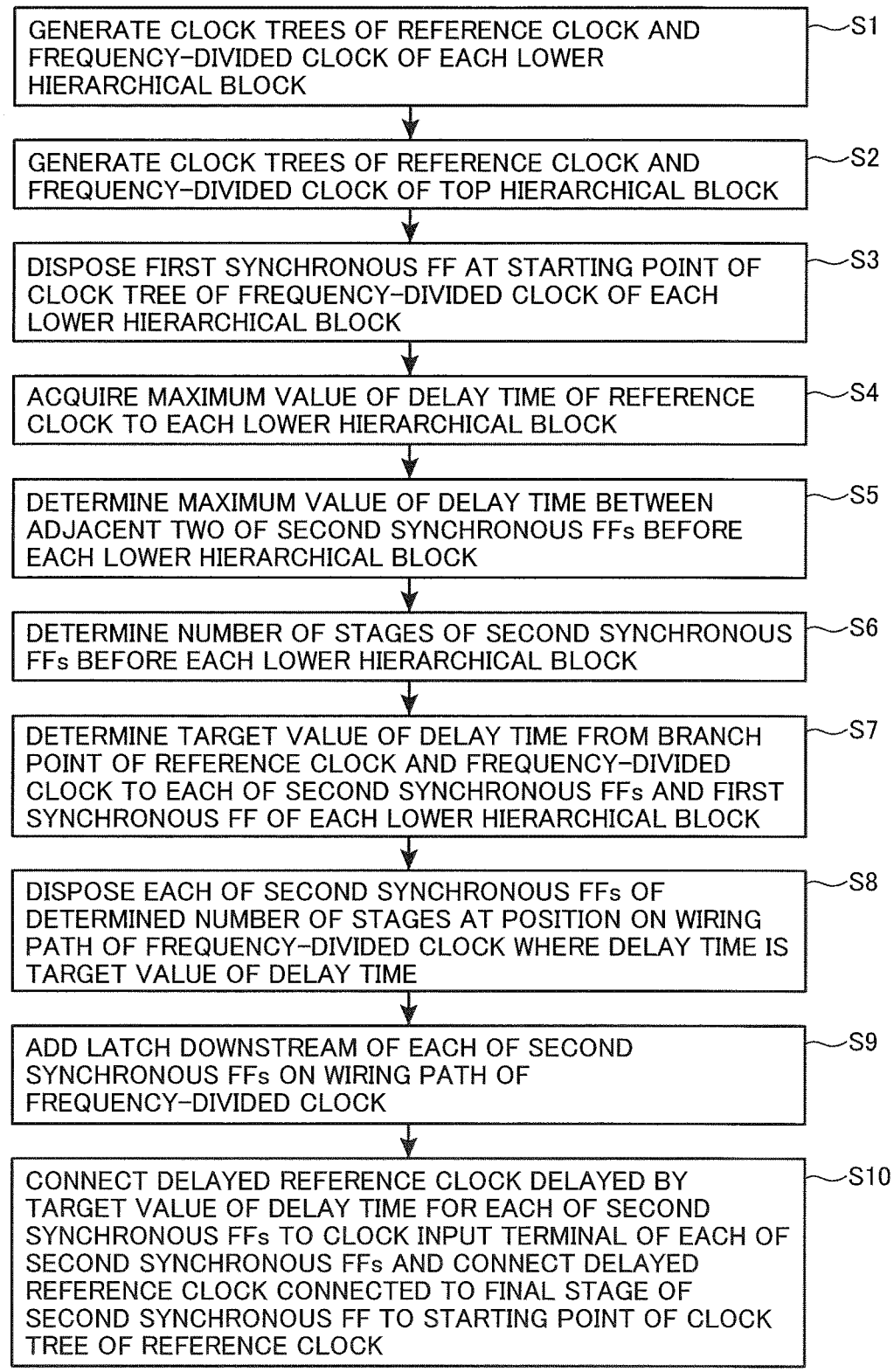
FIG. 2 is a flowchart of an example showing processes in the clock synchronization method of the invention.

Next, processes when the layout design of the reference clock and the frequency-divided clock is carried out according to the clock synchronization method of the invention will be described referring to the flowchart of FIG. 2.

When the layout design of the semiconductor integrated circuit 10 is carried out, first, in each of the lower hierarchical blocks A, B, and C, the clock trees 19 and 21 of the reference clock and the frequency-divided clock are generated using the technique of clock tree synthesis (Step S1).

With this, the clock tree 19 of the reference clock is generated such that the delay times from the starting point of the reference clock used inside each of the lower hierarchical blocks A, B, and C to all of the first terminal FFs 18 become the same. Similarly, the clock tree 21 of the frequency-divided clock is generated such that the delay times from the starting point of the frequency-divided clock used inside each of the lower hierarchical blocks A, B, and C to all of the second terminal FFs 20 become the same.

Figure 3:
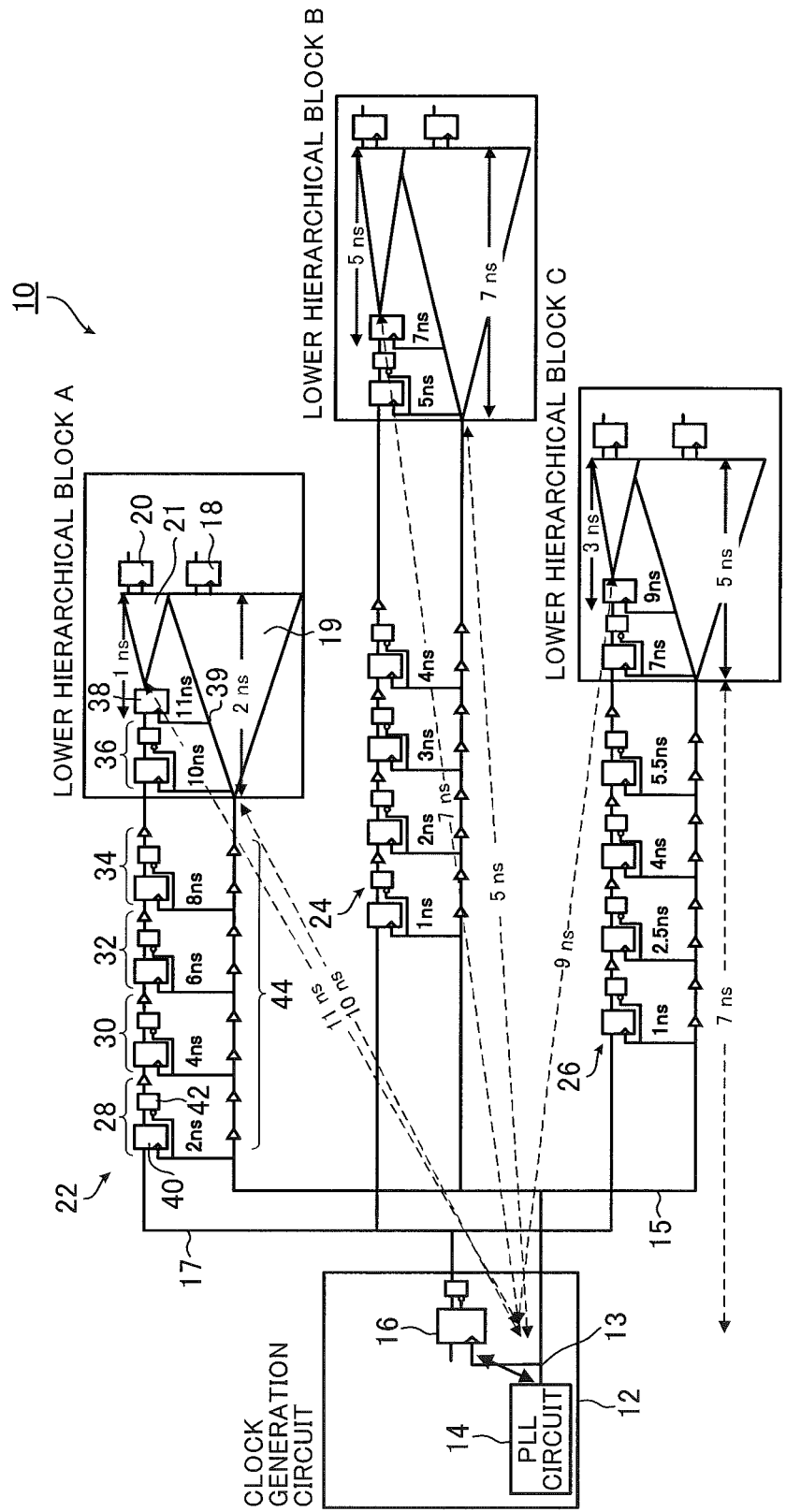
FIG. 3 is a conceptual diagram of an example showing delay times among cells in the semiconductor integrated circuit shown in FIG. 1.

In this embodiment, as shown in FIG. 3, in the lower hierarchical block A, the delay times from the starting points of the reference clock and the frequency-divided clock used therein to all of the first terminal FFs 18 and all of the second terminal FFs 20 are set to 2 ns and 1 ns, respectively. Similarly, in the lower hierarchical block B, the delay times from the starting points of the reference clock and the frequency-divided clock used therein to all of the first terminal FFs 18 and all of the second terminal FFs 20 are set to 7 ns and 5 ns, respectively, and in the lower hierarchical block C, the delay times from the starting points of the reference clock and the frequency-divided clock used therein to all of the first terminal FFs 18 and all of the second terminal FFs 20 are set to 5 ns and 3 ns, respectively.

Subsequently, in the top hierarchical block, on the basis of the result of the delay times in the clock trees 19 and 21 of the reference clock and the frequency-divided clock in each of the lower hierarchical blocks A, B, and C, clock trees of the reference clock and the frequency-divided clock in the top hierarchical block are generated such that the delay times from the branch point 13 of the reference clock 15 and the frequency-divided clock 17 to the first terminal FFs 18 and the second terminal FFs 20 in the lower hierarchical blocks A, B, and C in each of which the clock trees 19 and 21 of the reference clock and the frequency-divided clock have been generated become the same (Step S2).

Here, the branch point 13 of the reference clock 15 and the frequency-divided clock 17 is a point where the reference clock to be input to an FF is branched off from the wiring of the reference clock in order to input the reference clock to the FF which operates in synchronization with the reference clock.

In the example of FIG. 1, not to mention a point where the reference clock is branched off from the wiring of the reference clock to an FF of the frequency divider circuit 16, a point where the reference clock is branched off from the wiring of the reference clock to the second synchronous FF 40 of each of the lower hierarchical blocks A, B, and C, and a point where the reference clock is branched off from the wiring of the reference clock to the first synchronous FF 38 are branch points.

In this embodiment, as shown in FIG. 3, the delay times from the branch point 13 of the reference clock 15 and the frequency-divided clock 17 to the starting points (input terminals) of the reference clock and the frequency-divided clock used inside the lower hierarchical block A are set to 10 ns and 11 ns, respectively. Similarly, the delay times from the branch point 13 of the reference clock 15 and the frequency-divided clock 17 to the starting points of the reference clock and the frequency-divided clock used inside the lower hierarchical block B are set to 5 ns and 7 ns, respectively, and the delay times from the branch point 13 of the reference clock 15 and the frequency-divided clock 17 to the starting points of the reference clock and the frequency-divided clock used inside the lower hierarchical block C are set to 7 ns and 9 ns, respectively.

With this, all of the delay times from the branch point 13 of the reference clock 15 and the frequency-divided clock 17 to the first terminal FFs 18 and the second terminal FFs 20 in the lower hierarchical blocks A, B, and C can be adjusted to 12 ns, and all of the first terminal FFs 18 and the second terminal FFs 20 in the lower hierarchical blocks A, B, and C can be synchronously operated.

Subsequently, the first synchronous FF 38 is disposed at the starting point of the clock tree 21 of the frequency-divided clock in each of the lower hierarchical blocks A, B, and C (Step S3).

The reference clock is input from the clock tree 19 of the reference clock to the clock input terminal of the first synchronous FF 38 in each of the lower hierarchical blocks A, B, and C, and the frequency-divided clock 17 is input to the data input terminal of the first synchronous FF 38. The data output terminal of the first synchronous FF 38 is connected to the starting point of the clock tree 19 of the reference clock.

Here, disposing the first synchronous FF 38 at the starting point for the clock tree 21 of the frequency-divided clock covers not only a position of the starting point of the clock tree 21 of the frequency-divided clock but also a position with which a timing restriction between the first synchronous FF 38 and the second terminal FF 20 can be satisfied.

In this way, the first synchronous FF 38 is disposed at the starting point of the clock tree 21 of the frequency-divided clock inside each of the lower hierarchical blocks A, B, and C, whereby the branch point is moved from the branch point 13 of the reference clock 15 and the frequency-divided clock 17 to a branch point 39 of the reference clock and the frequency-divided clock in the first synchronous FF 38. Therefore, it is possible to shorten the wiring distance from the branch point to each second terminal FF 20, and thus, it is possible to reduce a timing margin and to facilitate timing closure.

The invention is not limited to the above configuration, and the first synchronous FF 38 may be disposed in the top hierarchical block. Also in this case, the first synchronous FF 38 is disposed at a position closer to the starting point of the clock tree 21 of the frequency-divided clock in each of the lower hierarchical blocks A, B, and C compared to the branch point 13 of the reference clock 15 and the frequency-divided clock 17, for example, at the starting point of the clock tree of the frequency-divided clock in each of the lower hierarchical blocks A, B, and C, whereby it is possible to reduce a timing margin.

Subsequently, the delay time of the reference clock 15 from the branch point 13 of the reference clock 15 and the frequency-divided clock 17 to the first synchronous FF 38 in each of the lower hierarchical blocks A, B, and C is determined, and the maximum value of the delay time of the reference clock 15 is acquired (Step S4).

By generating the clock trees 19 and 21 of the reference clock and the frequency-divided clock, a path of physical wiring from the branch point 13 of the reference clock 15 and the frequency-divided clock 17 to the first synchronous FF 38 in each of the lower hierarchical blocks A, B, and C is decided, and as a result, the distances of physical wiring of the reference clock 15 and the frequency-divided clock 17 are determined. Since the delay times per unit length of physical wiring of the reference clock 15 and the frequency-divided clock 17 and the delay time of each cell are known, based on these delay times, it is possible to calculate the delay time of the reference clock 15 from the branch point 13 of the reference clock 15 and the frequency-divided clock 17 to the first synchronous FF 38 in each of the lower hierarchical blocks A, B, and C.

In this embodiment, as shown in FIG. 3, the delay times of the reference clock 15 from the branch point 13 of the reference clock 15 and the frequency-divided clock 17 to the first synchronous FFs 38 in the lower hierarchical blocks A, B, and C are 11 ns, 7 ns, and 9 ns, respectively, and therefore, the maximum value of the delay time of the reference clock 15 is 11 ns.

Subsequently, the maximum value of the delay time of the reference clock 15 between adjacent two of the second synchronous FFs 40 disposed in series on the wiring path of the frequency-divided clock 17 before each of the lower hierarchical blocks A, B, and C is determined to be a time less than half the period of the reference clock 15 (Step S5).

In this embodiment, the period of the reference clock 15 is 5 ns, that is, the half period thereof is 2.5 ns, and the maximum value of the delay time of the reference clock 15 between adjacent two of the second synchronous FFs 40 disposed in series on the wiring path of the frequency-divided clock 17 associated with each of the lower hierarchical blocks A, B, and C is set to 2 ns. For example, through worst-case simulation, it is possible to determine the maximum value of the delay time of the reference clock 15 between adjacent two of the second synchronous FFs 40 to be a time less than half the period of the reference clock 15.

Subsequently, the number of stages of the second synchronous FFs 40 disposed in series on the wiring path of the frequency-divided clock 17 before each of the lower hierarchical blocks A, B, and C is determined so as to divide the wiring path of the frequency-divided clock 17 associated with each of the lower hierarchical blocks A, B, and C by a value which is equal to or greater than a division result obtained by dividing the maximum value of the delay time of the reference clock 15 by the maximum value of the delay time of the reference clock 15 between adjacent two of the second synchronous FFs 40 and which is a multiple of the number of frequency division of the frequency-divided clock 17 (Step S6).

In this embodiment, 11 ns which is the maximum value of the delay time of the reference clock 15 is divided by 2 ns which is the maximum value of the delay time of the reference clock 15 between adjacent two of the second synchronous FFs 40, whereby the division result is obtained as: 11 ns/2 ns=5.5. When the frequency-divided clock 17 is generated by dividing the frequency of the reference clock 15 by two, the number of stages of the second synchronous FFs 40 of each of the lower hierarchical blocks A, B, and C is determined to be five such that the wiring path of the frequency-divided clock 17 associated with each of the lower hierarchical blocks A, B, and C is divided by six which is equal to or greater than 5.5 being the division result and which is a multiple of 2.

Here, the number of stages of the second synchronous FFs 40 of each of the lower hierarchical blocks A, B, and C does not need to be the same if the phases are matched, and when the frequency-divided clock 17 is generated by dividing the frequency of the reference clock by n, the number of stages may be different by a multiple of n.

In order to facilitate the timing closure, the number of stages of the second synchronous FFs 40 of each of the lower hierarchical blocks A, B, and C may be determined such that the wiring path of the frequency-divided clock 17 associated with each of the lower hierarchical blocks A, B, and C is divided by a value which is equal to or greater than the division result and is equal to or greater than the minimum value of multiples of the frequency division number n of the frequency-divided clock 17.

Subsequently, a target value of the delay time from the branch point 13 of the reference clock 15 and the frequency-divided clock 17 to each of the second synchronous FFs 40 and the first synchronous FF 38 up to each of the lower hierarchical blocks A, B, and C is determined so as to be a delay time equal to or less than the maximum value of the delay time of the reference clock 15 between adjacent two of the second synchronous FFs 40 (Step S7).

For example, the target value of the delay time is determined so as to be a delay time equal to or less than the maximum value of the delay time of the reference clock 15 between adjacent two of the second synchronous FFs 40 by dividing the delay time of the reference clock 15 of each of the lower hierarchical blocks A, B, and C by the determined number of stages of the second synchronous FFs 40.

In this embodiment, as shown in FIG. 3, in the case of the lower hierarchical block A, the delay times from the branch point 13 of the reference clock 15 and the frequency-divided clock 17 to the second synchronous FFs 40 of five stages and the first synchronous FF 38 are set to 2 ns, 4 ns, 6 ns, 8 ns, 10 ns, and 11 ns, respectively, so as to each be a delay time of 2 ns which is the maximum value of the delay time of the reference clock 15 between adjacent two of the second synchronous FFs 40. Similarly, in the case of the lower hierarchical block B, the delay times from the branch point 13 of the reference clock 15 and the frequency-divided clock 17 to the second synchronous FFs 40 of five stages and the first synchronous FF 38 are set to 1 ns, 2 ns, 3 ns, 4 ns, 5 ns, and 7 ns, respectively. In the case of the lower hierarchical block C, the delay times from the branch point 13 of the reference clock 15 and the frequency-divided clock 17 to the second synchronous FFs 40 of five stages and the first synchronous FF 38 are set to 1 ns, 2.5 ns, 4 ns, 5.5 ns, 7 ns, and 9 ns, respectively.

Subsequently, each of the second synchronous FFs 40 of the determined number of stages is disposed at a position on the wiring path of the frequency-divided clock 17 where the delay time from the branch point 13 of the reference clock 15 and the frequency-divided clock 17 to each of the second synchronous FFs 40 of the determined number of stages and the first synchronous FF 38 of each of the lower hierarchical blocks A, B, and C is the relevant target value of the delay time (Step S8).

The second synchronous FFs 40 of the determined number of stages are disposed in series on the wiring path of the frequency-divided clock 17 associated with each of the lower hierarchical blocks A, B, and C. Furthermore, the frequency-divided clock 17 is connected to the data input terminal of the first-stage second synchronous FF 40, and the data output terminal of the final-stage second synchronous FF 40 is connected to the data input terminal of the first synchronous FF 38.

As described above, the delay times per unit length of physical wiring of the reference clock 15 and the frequency-divided clock 17 and the delay time of each cell are known. Therefore, based on these delay times, the delay time from the branch point 13 of the reference clock 15 and the frequency-divided clock 17 to each of the second synchronous FFs 40 and the first synchronous FF 38 of each of the lower hierarchical blocks A, B, and C is calculated, whereby the position on the wiring path of the frequency-divided clock 17 (the wiring distance from the branch point 13 of the reference clock 15 and the frequency-divided clock 17) where each calculated delay time is the target value of the delay time can be acquired.

In this embodiment, the second synchronous FFs 40 of the first to fourth stages among the second synchronous FFs 40 of the determined five stages are disposed in the top hierarchical block, and the final-stage second synchronous FF 40 is disposed inside each of the lower hierarchical blocks A, B, and C.

In this way, when the first synchronous FF 38 is disposed inside each of the lower hierarchical blocks A, B, and C, at least one of the second synchronous FFs 40 of the determined number of stages may be disposed inside each of the lower hierarchical blocks A, B, and C. Alternatively, the first synchronous FF 38 and the second synchronous FFs 40 of the determined number of stages may be disposed in the top hierarchical block.

Subsequently, the latch 42 is disposed downstream of each of the second synchronous FFs 40 on the wiring path of the frequency-divided clock 17 (Step S9).

The inversion of the reference clock or the delayed reference clock which is connected to the clock input terminal of the second synchronous FF 40 in the same basic synchronization circuit is connected to the clock input terminal of the latch 42, and the output signal of the second synchronous FF 40 in the same basic synchronization circuit is connected to the data input terminal of the latch 42. Furthermore, the data output terminal of the latch 42 is connected to the data input terminal of the second synchronous FF 40 in the subsequent-stage basic synchronization circuit.

Finally, the delayed reference clock obtained by sequentially delaying the reference clock connected to the clock input terminal of the first-stage second synchronous FF 40 of each of the lower hierarchical blocks A, B, and C by the relevant target value of the delay time for each of the second synchronous FFs 40 by the buffers 44, is connected to the clock input terminal of each of the second synchronous FFs 40, and the delayed reference clock connected to the final-stage second synchronous FF 40 is connected to the starting point of the clock tree 19 of the reference clock (Step S10).

With the above processes, the layout design of the reference clock 15 and the frequency-divided clock 17 is completed.

Figure 4:
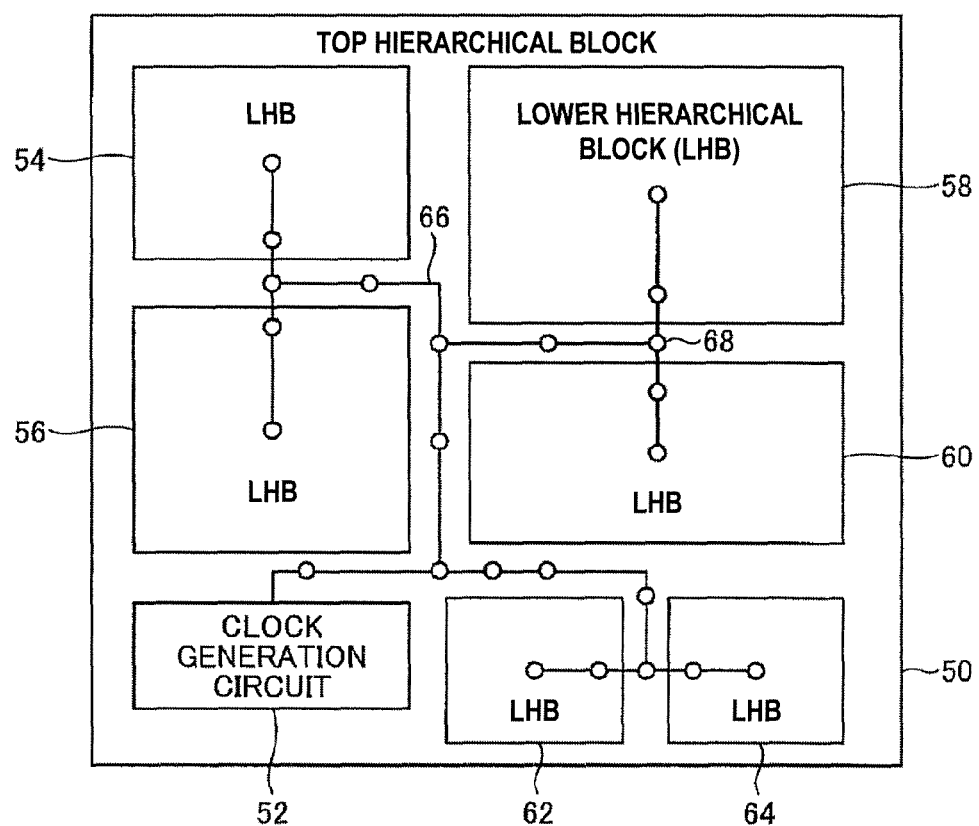
FIG. 4 is a block diagram showing an example of the case where a reference clock and a frequency-divided clock are supplied from a clock generation circuit to six lower hierarchical blocks.

FIG. 4 is a block diagram showing an example of the case where a reference clock and a frequency-divided clock are supplied from a clock generation circuit to six lower hierarchical blocks. A line 66 extending from a clock generation circuit 52 in a top hierarchical block 50 to each of lower hierarchical blocks 54, 56, 58, 60, 62, and 64 represents a physical wiring path of the clock trees of the reference clock and the frequency-divided clock, and circles 68 represent positions where basic synchronization circuits and first synchronous FFs are disposed.

In this example, the number of stages of the basic synchronization circuits and the first synchronous FF from the branch point of the reference clock and the frequency-divided clock in the clock generation circuit 52 to the first synchronous FF of each of the lower hierarchical blocks 54, 56, 58, 60, 62, and 64 is the same, that is, eight. Furthermore, the second synchronous FFs of each of the basic synchronization circuits are disposed within a certain distance which satisfies the maximum value of the delay time of the reference clock between adjacent two of the second synchronous FFs, whereby the set-up/hold restriction is automatically satisfied without carrying out complicated delay time adjustment.

Figure 5A:
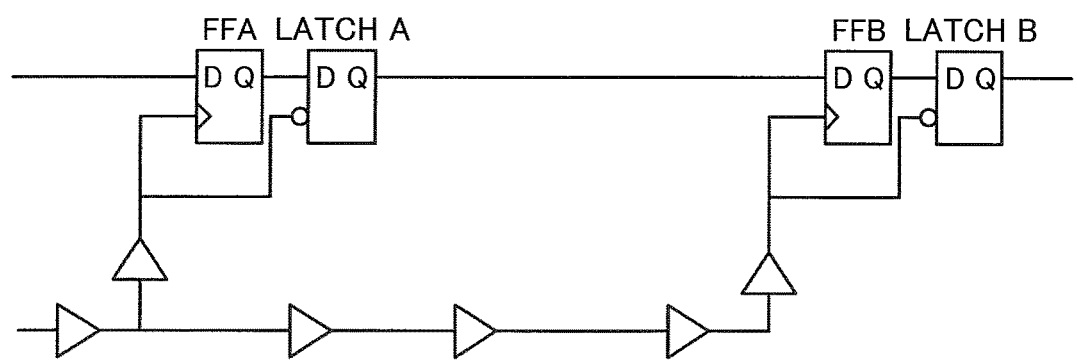
FIG. 5A is a circuit diagram of an example showing the configuration of a part of a clock synchronization circuit shown in FIG. 1.

As with the case of the conventional circuit, also in the semiconductor integrated circuit 10 of this embodiment, in order to prevent punch-through of data, data D of a subsequent-stage FFB needs to be changed after the rise of a clock CLK of the FFB, as shown in FIG. 5A.

Figure 5B:
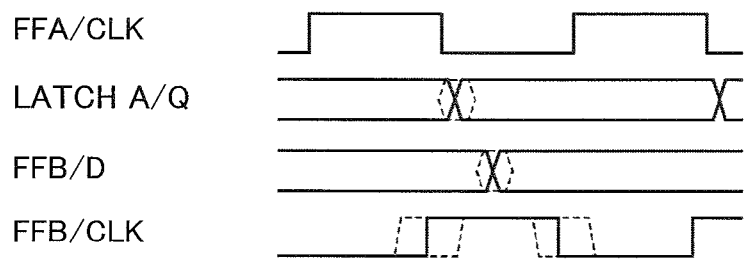
FIG. 5B is a timing chart of an example showing the operation of the circuit shown in FIG. 5A.
Figure 6:
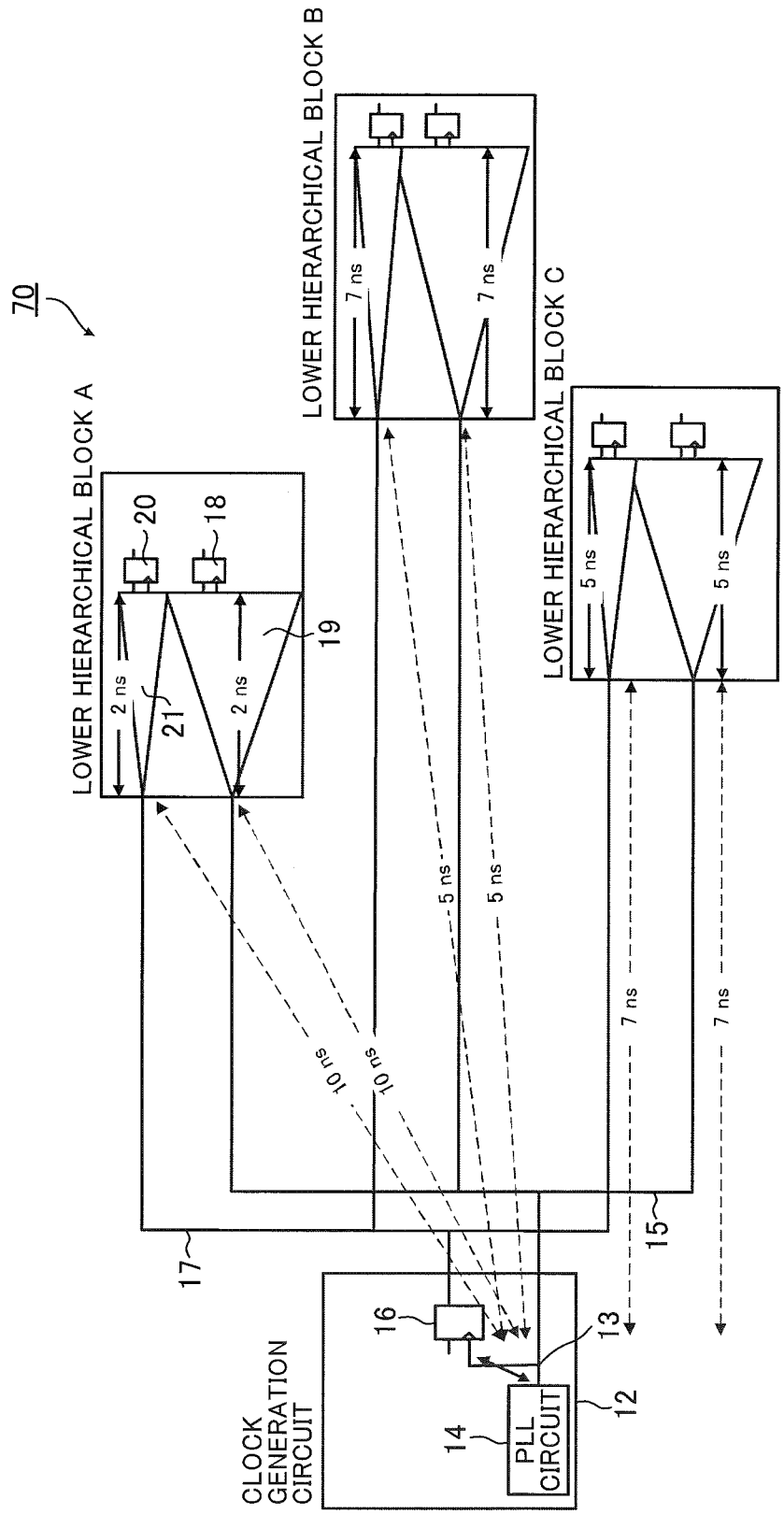
FIG. 6 is a conceptual diagram of an example showing the configuration of a conventional semiconductor integrated circuit.
Figure 7:
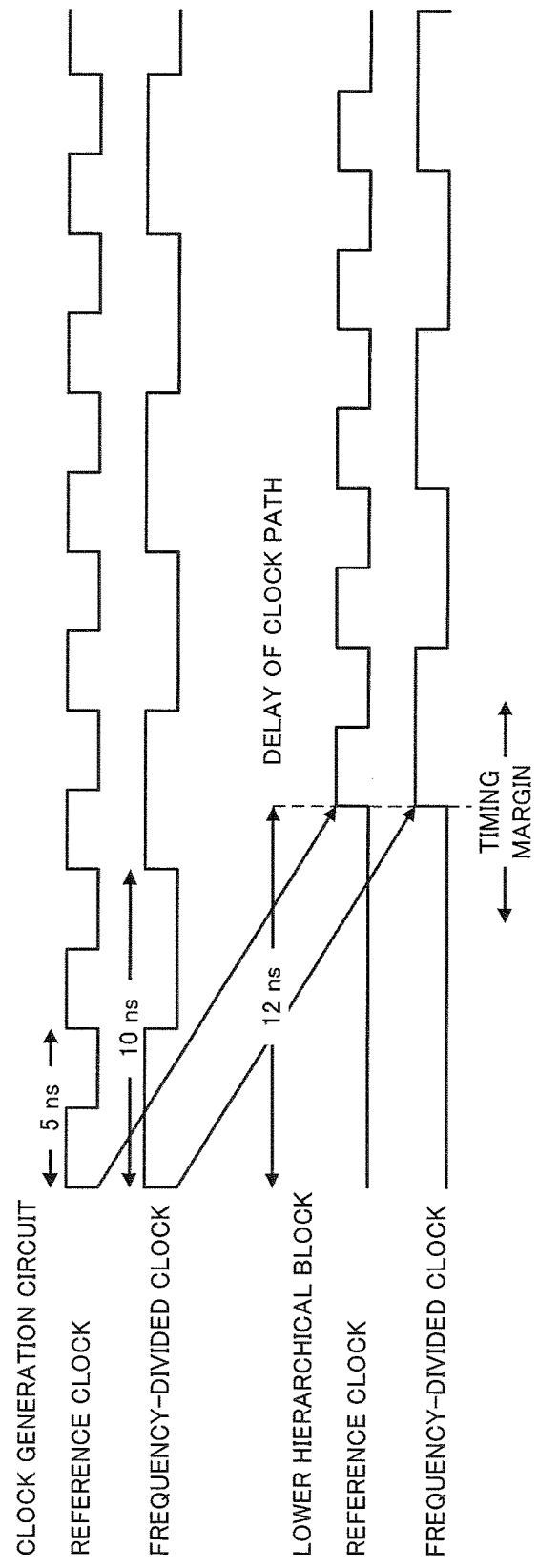
FIG. 7 is a timing chart of an example showing the operation of the semiconductor integrated circuit shown in FIG. 6.
Figure 8:
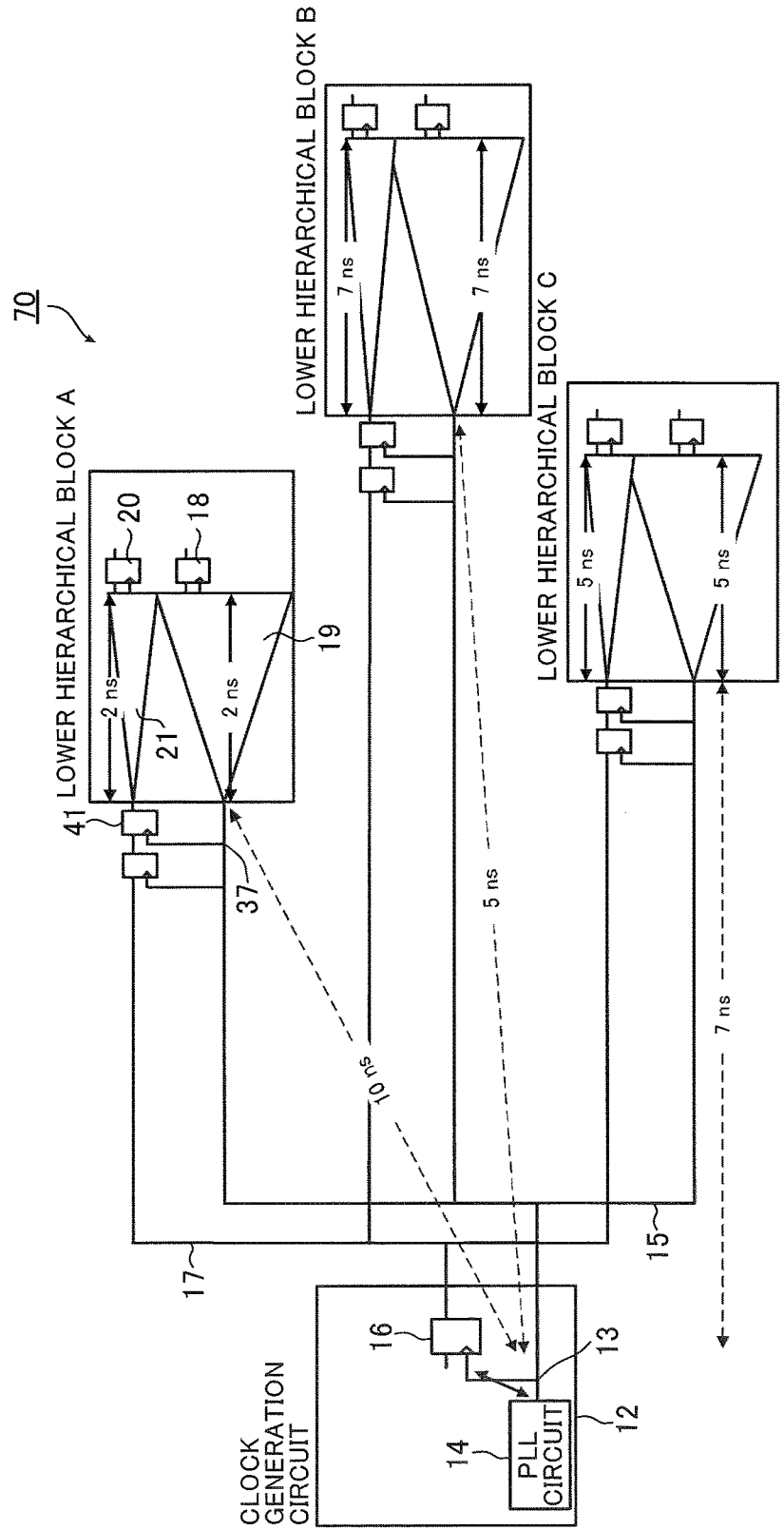
FIG. 8 is a conceptual diagram of another example showing the configuration of a conventional semiconductor integrated circuit.
Figure 9:
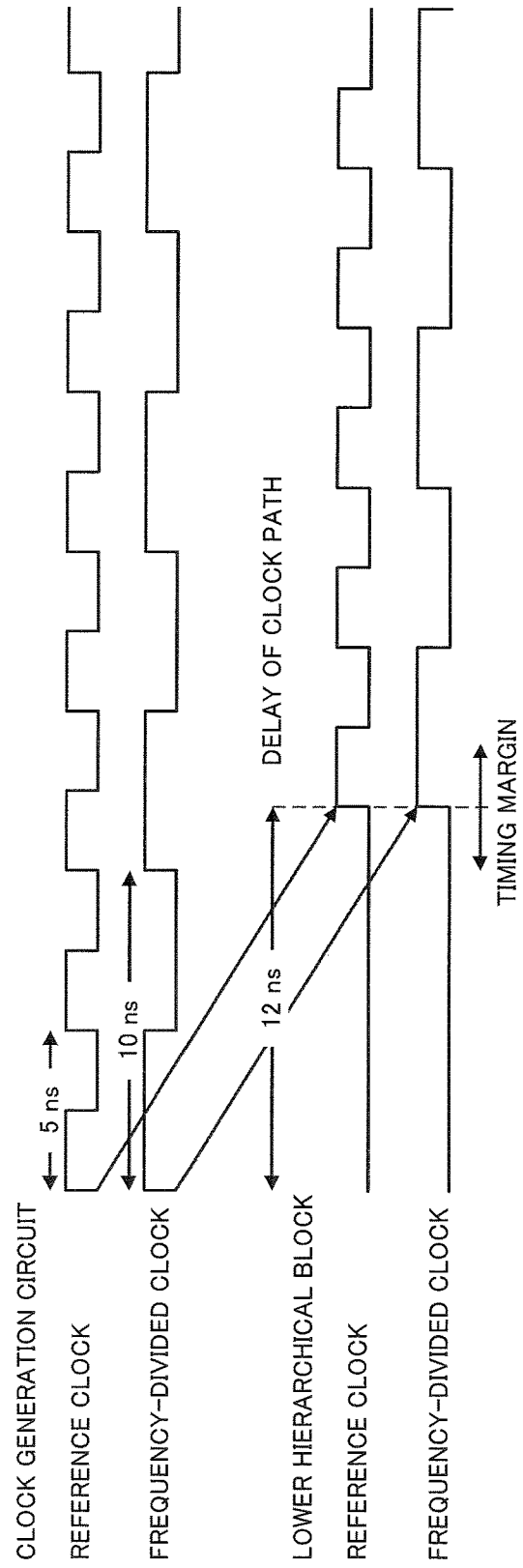
FIG. 9 is a timing chart of an example showing the operation of the semiconductor integrated circuit shown in FIG. 8.
Figure 10:
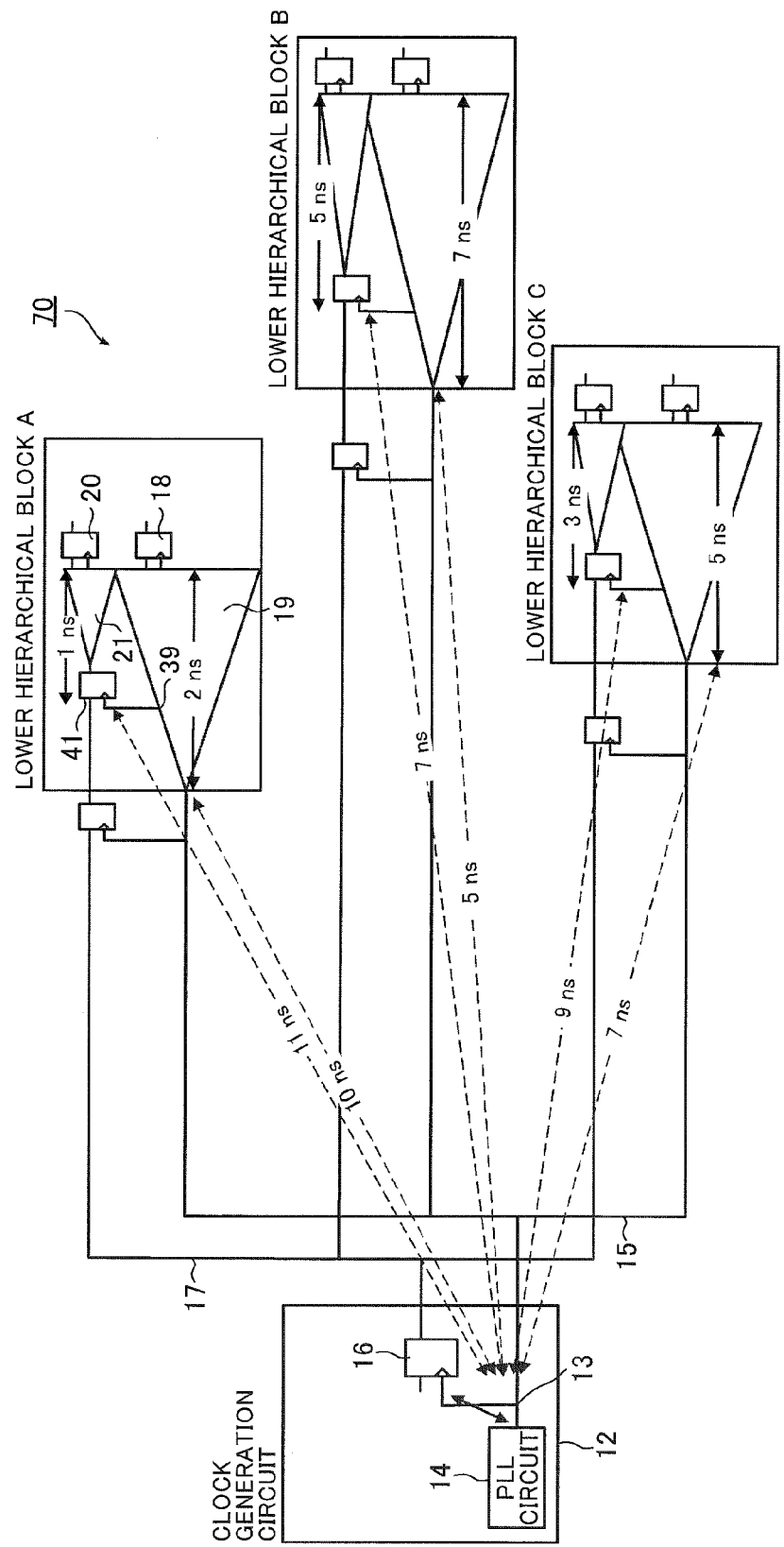
FIG. 10 is a conceptual diagram of another example showing the configuration of a conventional semiconductor integrated circuit.
Figure 11:
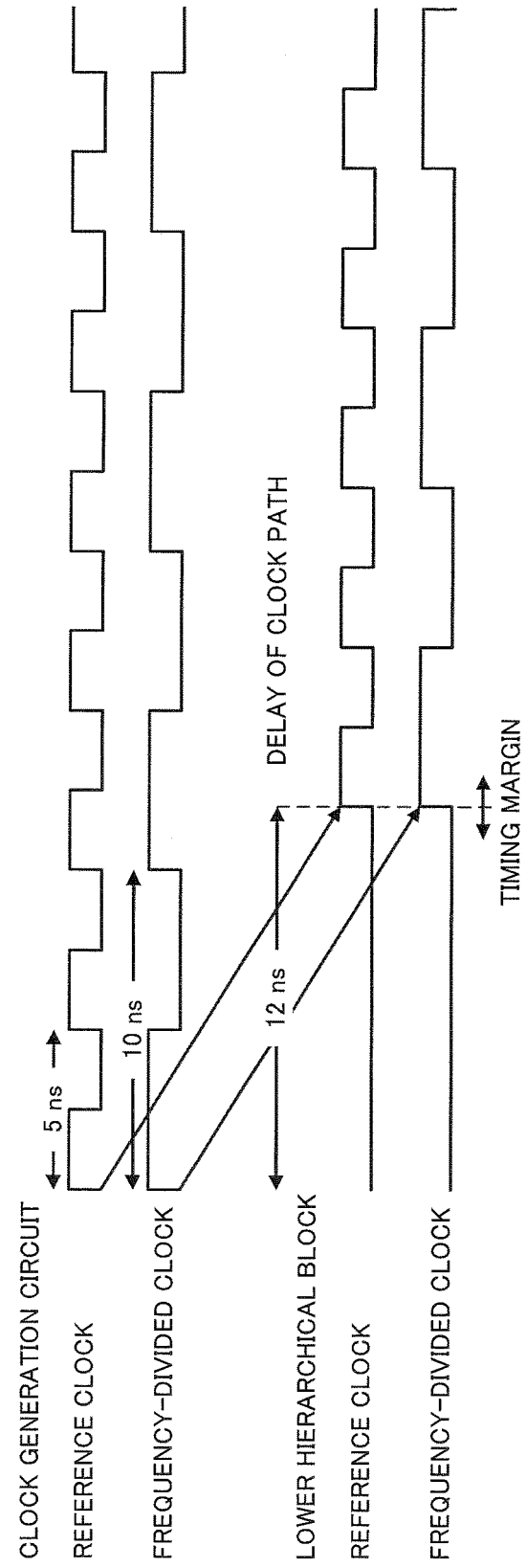
FIG. 11 is a timing chart of an example showing the operation of the semiconductor integrated circuit shown in FIG. 10.
Figure 12:
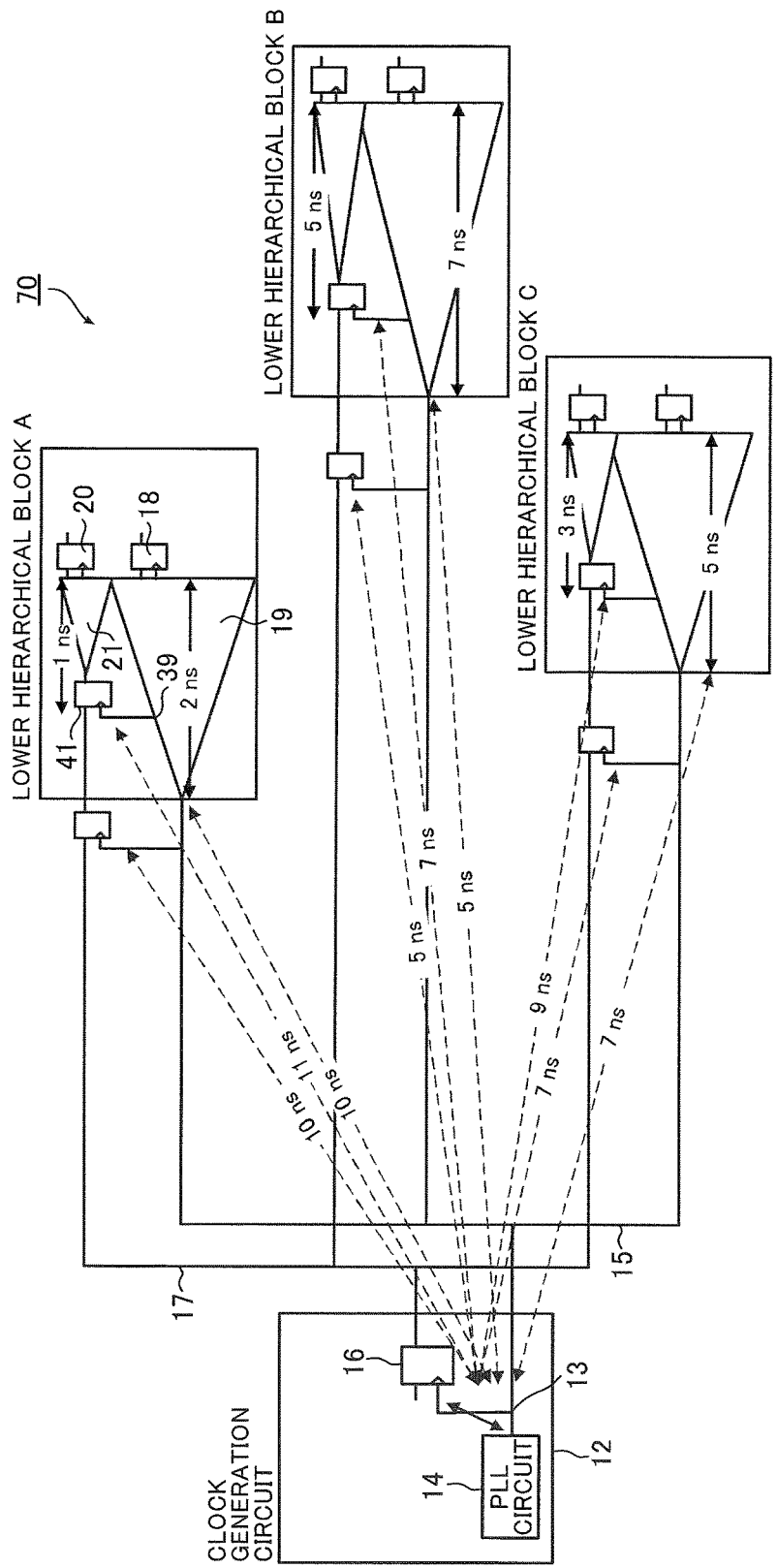
FIG. 12 is a conceptual diagram of an example showing delay times among cells in the semiconductor integrated circuit shown in FIG. 10.
Figure 13:
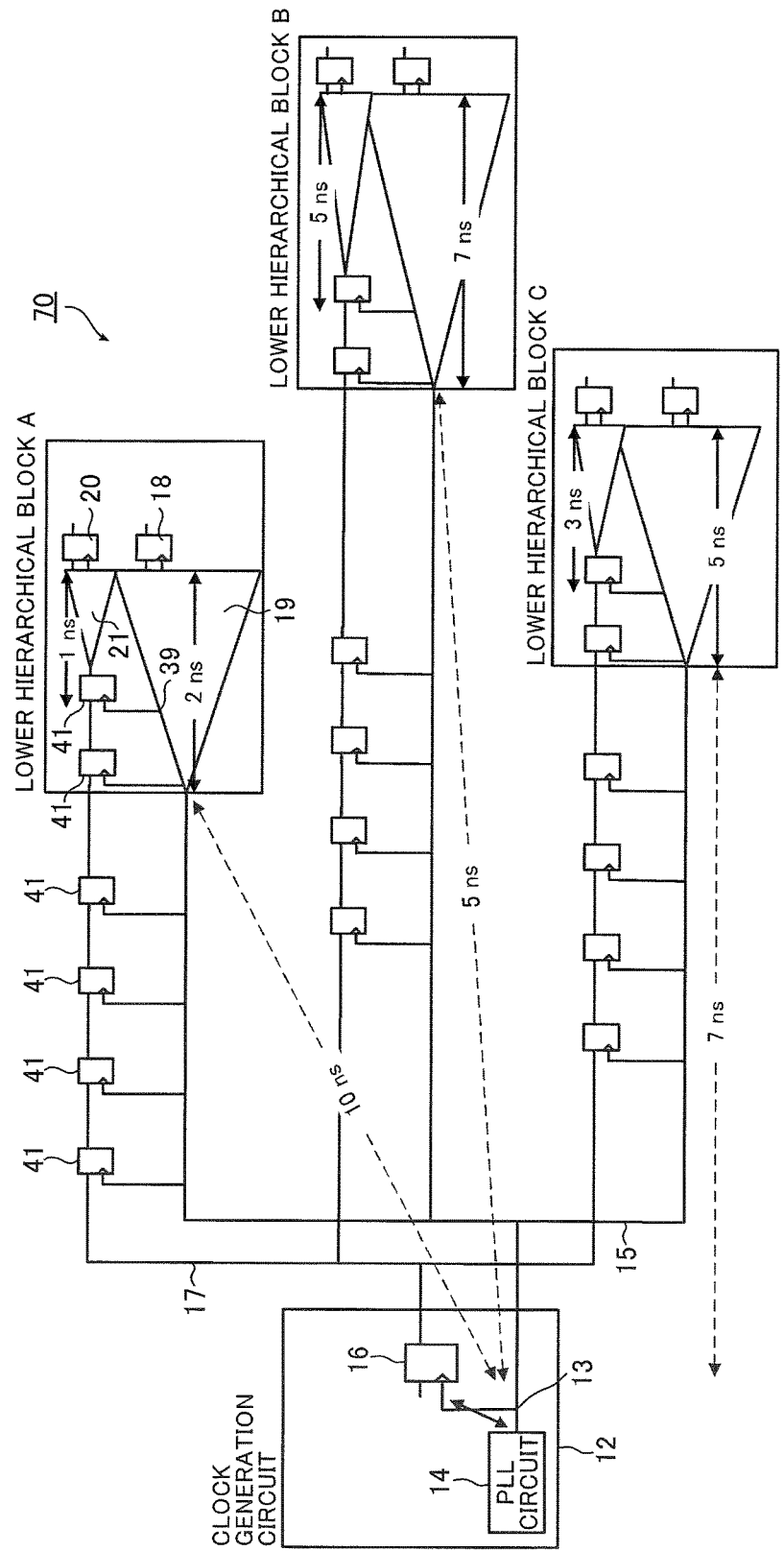
FIG. 13 is a conceptual diagram of another example showing the configuration of a conventional semiconductor integrated circuit.
Figure 14:
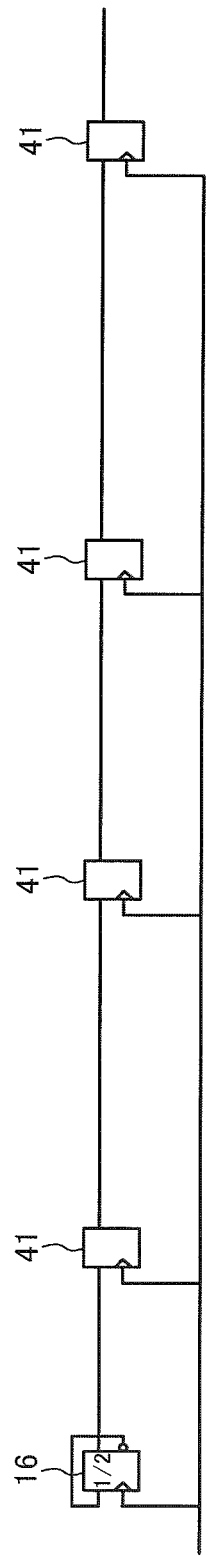
FIG. 14 is a circuit diagram of an example showing the configuration of a part of the clock synchronization circuit shown in FIG. 13.
Figure 15:
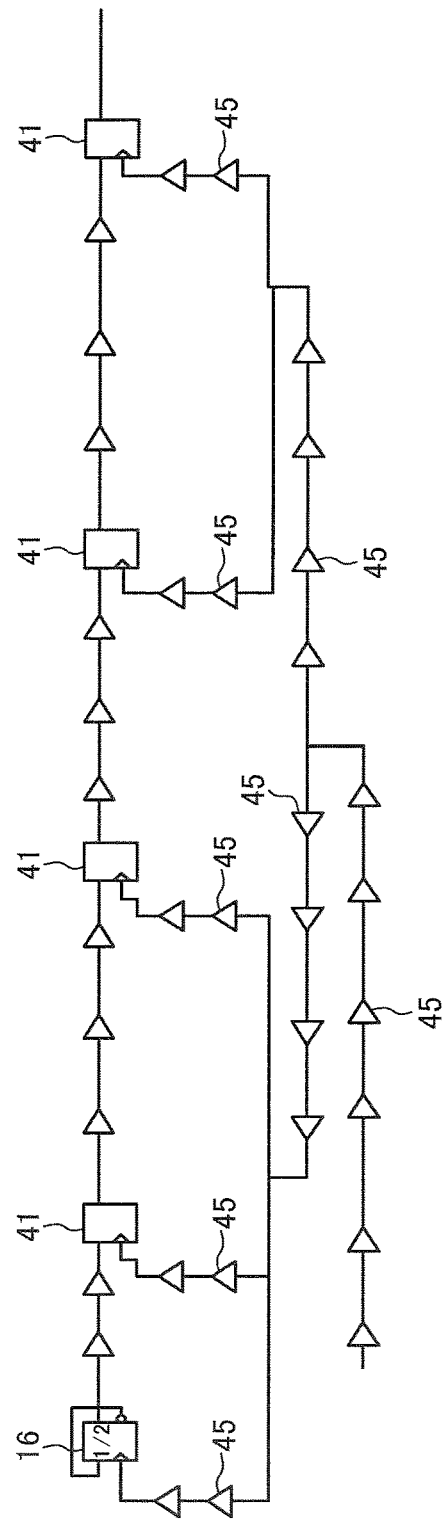
FIG. 15 is a circuit diagram of another example showing the configuration of a part of the clock synchronization circuit shown in FIG. 13.
Figure 16:
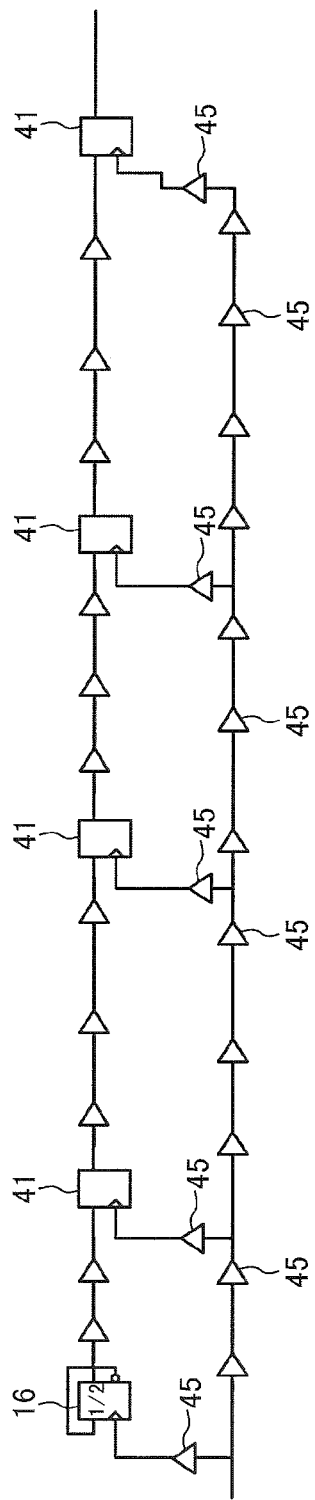
FIG. 16 is a circuit diagram of another example showing the configuration of a part of the clock synchronization circuit shown in FIG. 13.
Figure 17A:
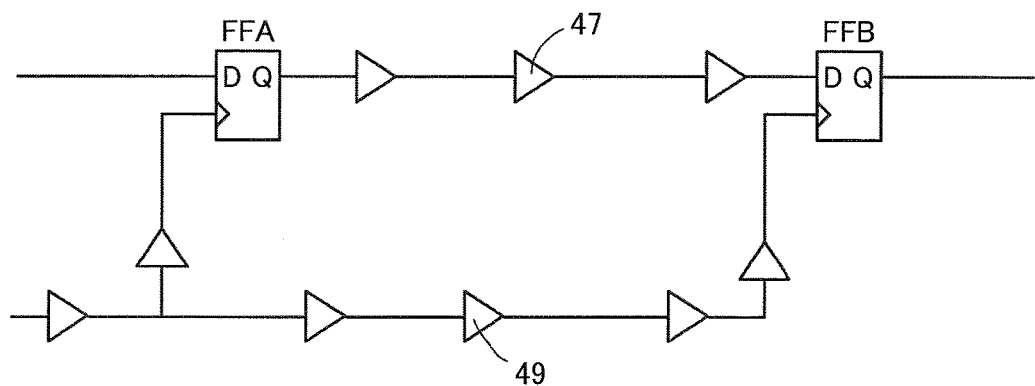
FIG. 17A is a circuit diagram of an example showing the configuration of a part of the clock synchronization circuit shown in FIG. 16.
Figure 17B:
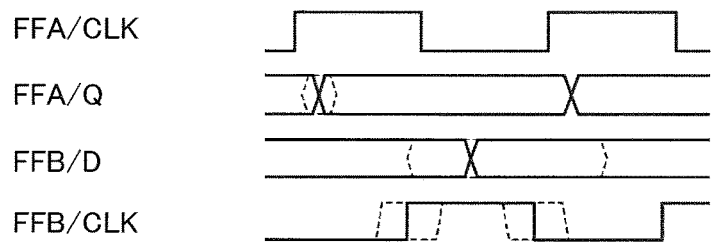
FIG. 17B is a timing chart of an example showing the operation of the circuit shown in FIG. 17A.

However, in this embodiment, a latch A is added downstream of an FFA, whereby during a period during which the clock CLK is at high level, the latch A holds data D which has passed therethrough during a period during which the clock CLK was at low level, and outputs data D as data Q, as shown in FIG. 5B. With this, the start timing of change of data Q is reliably delayed by a time corresponding to half the period of the clock CLK, and thus, it is not necessary to secure the delay time with a buffer.

That is, even when the clock CLK of the subsequent-stage FFB is delayed more than the clock CLK of the preceding-stage FFA, if the delay time is within a period during which data Q is held by the latch, there is no problem. Furthermore, since data Q flows in one direction, even if the clock CLK of the subsequent-stage FFB is earlier than the clock CLK of the preceding-stage FFA, there is no problem as long as the delay time is less than one period of the clock CLK. In this way, a margin is given to the arrival time of the clock CLK by adding the latch, and timing closure is facilitated.

For example, when the period of the clock is 5 ns, owing to the latch A disposed downstream of the FFA, the latch A holds data D for 2.5 ns, which is half the period of the clock CLK, after the clock CLK becomes high level, and outputs data Q. Therefore, as long as the delay time of the clock CLK from the FFA to the subsequent-stage FFB is less than 2.5 ns, a hold violation is prevented. By using this, in this example, even if the maximum value of the delay time of the clock CLK between the FFA and the FFB is increased to, for example, 2 ns, the timing restriction can be satisfied without problems.

The cell delay of the data path becomes a small delay corresponding to one stage of the latch A, and even if this cell delay fluctuates due to the operation environment, the fluctuation range is extremely small compared to the case having a plurality of stages of buffers. Therefore, timing closure is outstandingly facilitated compared to the conventional circuit, and the time and effort wasted for timing adjustment in the conventional circuit are not required.

In the semiconductor integrated circuit 10, the set-up/hold restriction between adjacent two of the first synchronous FF 38 and the second synchronous FFs 40 only has to be satisfied in the wiring path of the frequency-divided clock 17, and this timing restriction is easily satisfied by adding the latch 42. Therefore, even if a delay difference of clock between the first-stage second synchronous FF 40 and the first synchronous FF 38 in the clock synchronization circuit exceeds the period of the reference clock 15, of even if the clock delays of the first terminal FFs 18 and the second terminal FFs 20 in the plurality of lower hierarchical blocks A, B, and C are inconsistent, it is possible to design the semiconductor integrated circuit without problems.

The first synchronous FF 38 and the second synchronous FFs 40 may be each operated in synchronization with the fall of the reference clock 15. In this case, the reference clock 15 or the delayed reference clock is input to the clock input terminal of the latch 42. That is, it suffices if the latch 42 is operated so as to hold the output of the preceding-stage second synchronous FF 40 for half of the clock period, regardless of whether the first synchronous FF 38 and the second synchronous FFs 40 are each operated in synchronization with the rise of the reference clock 15 or with the fall of the reference clock 15.

The invention is basically as described above.

Hereinbefore, the invention has been described in detail, but the invention is not limited to the foregoing embodiment. Needless to say, the invention may be improved or modified in various ways within a scope that does not depart from the gist of the invention.

What is claimed is:

1. A clock synchronization method for synchronizing phases of a reference clock and a frequency-divided clock obtained by dividing frequency of the reference clock, the reference clock and the frequency-divided clock being supplied from a clock generation circuit in a top hierarchical block to first terminal flip-flops (FFs) operating in synchronization with the reference clock and second terminal FFs operating in synchronization with the frequency-divided clock through a clock tree of the reference clock and a clock tree of the frequency-divided clock in each of a plurality of lower hierarchical blocks, the clock synchronization method comprising:

a step of disposing a first synchronous FF connected to a starting point of the clock tree of the reference clock in each of the plurality of lower hierarchical blocks, the first synchronous FF holding the frequency-divided clock as a data signal at a starting point of the clock tree of the frequency-divided clock of each of the plurality of lower hierarchical blocks in synchronization with the reference clock input from the clock tree of the reference clock in each of the plurality of lower hierarchical blocks and inputting the held data signal of the frequency-divided clock as a data input;

a step of determining a delay time of the reference clock from a branch point of the reference clock and the frequency-divided clock to the first synchronous FF of each of the plurality of lower hierarchical blocks and acquiring a maximum value of the delay time of the reference clock;

a step of determining a maximum value of a delay time of the reference clock between adjacent two of second synchronous FFs disposed in series on a wiring path of the frequency-divided clock associated with each of the plurality of lower hierarchical blocks so as to be a time less than half the period of the reference clock;

a step of determining the number of stages of the second synchronous FFs, which are disposed in series on the wiring path of the frequency-divided clock associated with each of the plurality of lower hierarchical blocks and sequentially hold the frequency-divided clock as a data signal in synchronization with the reference clock, such that the wiring path of the frequency-divided clock associated with each of the plurality of lower hierarchical blocks is divided by a value which is equal to or greater than a division result obtained by dividing the maximum value of the delay time of the reference clock by the maximum value of the delay time of the reference clock between adjacent two of the second synchronous FFs and is a multiple of a frequency division number of the frequency-divided clock;

a step of determining a target value of a delay time from the branch point of the reference clock and the frequency-divided clock to each of the second synchronous FFs and the first synchronous FF of each of the plurality of lower hierarchical blocks so as to be a delay time equal to or less than the maximum value of the delay time of the reference clock between adjacent two of the second synchronous FFs;

a step of disposing each of the second synchronous FFs of the determined number of stages at a position on the wiring path of the frequency-divided clock where the delay time from the branch point of the reference clock and the frequency-divided clock to each of the second synchronous FFs of the determined number of stages and the first synchronous FF of each of the plurality of lower hierarchical blocks is the target value of the delay time;

a step of disposing a latch downstream of each of the second synchronous FFs on the wiring path of the frequency-divided clock, the latch allowing an output signal of a preceding-stage second synchronous FF to pass during a period during which the reference clock connected to a clock input terminal of the preceding-stage second synchronous FF is at low level; and a step of connecting a delayed reference clock obtained by delaying the reference clock connected to a clock input terminal of a first-stage second synchronous FF of each of the plurality of lower hierarchical blocks by a relevant target value of the delay time for each of the second synchronous FFs, to a clock input terminal of each of the second synchronous FFs and connecting the delayed reference clock connected to a final-stage second synchronous FF to the starting point of the clock tree of the reference clock.

2. The clock synchronization method according to claim 1, wherein the first synchronous FF is disposed inside each of the plurality of lower hierarchical blocks.

3. The clock synchronization method according to claim 2, wherein at least one of the second synchronous FFs disposed in series on the wiring path of the frequency-divided clock associated with each of the plurality of lower hierarchical blocks is disposed inside each of the plurality of lower hierarchical blocks.

4. The clock synchronization method according to claim 1, wherein the first synchronous FF, and the second synchronous FFs disposed in series on the wiring path of the frequency-divided clock associated with each of the plurality of lower hierarchical blocks are disposed in the top hierarchical block.

5. The clock synchronization method according to claim 1, wherein the delay time of the reference clock from the branch point of the reference clock and the frequency-divided clock to the first synchronous FF of each of the plurality of lower hierarchical blocks is calculated based on a physical wiring distance of the reference clock, a delay time per unit length of physical wiring of the reference clock, and a delay time of each cell.

6. The clock synchronization method according to claim 1, wherein the maximum value of the delay time of the reference clock between adjacent two of the second synchronous FFs is determined so as to be a time less than half the period of the reference clock through worst-case simulation.

7. The clock synchronization method according to claim 1, wherein, when the frequency-divided clock is generated by dividing the frequency of the reference clock by n (where n is an integer equal to or greater than two), the numbers of stages of the second synchronous FFs of each of the plurality of lower hierarchical blocks are same or different from each other by a multiple of n.

8. The clock synchronization method according to claim 1, wherein the number of stages of the second synchronous FFs of each of the plurality of lower hierarchical blocks is determined such that the wiring path of the frequency-divided clock associated with each of the plurality of lower hierarchical blocks is divided by a value which is equal to or greater than the division result and which is equal to or greater than a minimum value of multiples of the frequency division number of the frequency-divided clock.

9. The clock synchronization method according to claim 1, wherein the target value of the delay time is determined so as to be a delay time equal to or less than the maximum value of the delay time of the reference clock between adjacent two of the second synchronous FFs by dividing the delay time of the reference clock of each of the plurality of lower hierarchical blocks by the determined number of stages of the second synchronous FFs.

10. The clock synchronization method according to claim 1, wherein the delay time from the branch point of the reference clock and the frequency-divided clock to each of the second synchronous FFs and the first synchronous FF of each of the plurality of lower hierarchical blocks is calculated based on a delay time per unit length of physical wiring of the reference clock and a delay time of each cell.

* * * * *